United States Patent
Matsumiya

(10) Patent No.: US 7,228,754 B2
(45) Date of Patent: Jun. 12, 2007

(54) STEERING APPARATUS FOR A CAR AND METHOD OF MANUFACTURING THE SAME

(75) Inventor: Takeshi Matsumiya, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/080,471

(22) Filed: Mar. 16, 2005

(65) Prior Publication Data

US 2005/0160863 A1 Jul. 28, 2005

Related U.S. Application Data

(63) Continuation of application No. 10/207,781, filed on Jul. 31, 2002, now abandoned.

(30) Foreign Application Priority Data

| Aug. 6, 2001 | (JP) | ............................ 2001-238198 |
| Dec. 17, 2001 | (JP) | ............................ 2001-383244 |

(51) Int. Cl.
B62D 1/18 (2006.01)
(52) U.S. Cl. ....................... 74/493; 280/775
(58) Field of Classification Search .................. 74/493; 280/775
See application file for complete search history.

(56) References Cited

U.S. PATENT DOCUMENTS

| 3,599,757 | A |   | 8/1971  | Takamatsu ................... 188/371 |
|-----------|---|---|---------|--------------------------------------|
| 3,693,997 | A |   | 9/1972  | Dreyer ........................ 280/775 |
| 4,602,520 | A |   | 7/1986  | Nishikawa et al. ........... 74/493 |
| 4,941,679 | A |   | 7/1990  | Baumann et al. ........... 280/775 |
| 5,009,120 | A |   | 4/1991  | Iseler et al. ..................... 74/493 |
| 5,029,489 | A |   | 7/1991  | Burmeister et al. ........... 74/493 |
| 5,213,003 | A | * | 5/1993  | Speich ......................... 74/493 |
| 5,265,906 | A |   | 11/1993 | Faulstroh ................... 280/775 |
| 5,730,465 | A |   | 3/1998  | Barton et al. ............... 280/775 |
| 5,735,631 | A |   | 4/1998  | Patzelt et al. ............... 403/378 |
| 5,788,277 | A |   | 8/1998  | Hibino et al. ............... 280/775 |
| 5,845,936 | A |   | 12/1998 | Higashino .................... 280/775 |
| 5,902,186 | A |   | 5/1999  | Gaukel ....................... 464/162 |
| 6,039,350 | A |   | 3/2000  | Patzelt et al. ............... 280/775 |
| 6,149,526 | A |   | 11/2000 | Boersma et al. .............. 464/89 |
| 6,189,405 | B1 |  | 2/2001  | Yazane ........................ 74/493 |
| 6,189,919 | B1 |  | 2/2001  | Sinnhuber et al. .......... 280/731 |
| 6,193,612 | B1 |  | 2/2001  | Craig et al. ................. 464/162 |
| 6,237,439 | B1 |  | 5/2001  | Weber et al. ................. 74/493 |
| 6,540,429 | B2 |  | 4/2003  | Weisgerer et al. .......... 403/321 |
| 6,543,266 | B1 |  | 4/2003  | Jackel ........................... 72/61 |

FOREIGN PATENT DOCUMENTS

| DE | 38 09 442  | 10/1989 |
| DE | 197 33 474 | 8/1997  |

(Continued)

*Primary Examiner*—William C. Joyce
(74) *Attorney, Agent, or Firm*—Miles & Stockbridge P.C.

(57) ABSTRACT

In a steering apparatus for a car which presses and retains a steering column upon a fixing bracket to car body to be telescopically adjustable, the steering column is molded from a tubular material by a hydroforming process to have a swelled portion as a unitary structure thereof. There is formed on each side surface of this swelled portion an elongated hole for telescopic adjustment through which a fastening bolt of a clamp mechanism provided on a fixed bracket to steering column is inserted.

4 Claims, 9 Drawing Sheets

FOREIGN PATENT DOCUMENTS

| | | |
|---|---|---|
| DE | 197 37 035 | 8/1997 |
| EP | 0 647 537 | 4/1995 |
| EP | 0 721 875 | 7/1996 |
| EP | 0 770 537 | 5/1997 |
| GB | 2 113 164 | 8/1983 |
| GB | 2 304 866 | 3/1997 |
| JP | UM 6-74562 | 10/1994 |
| JP | 8-276852 | 10/1996 |
| JP | 10-35511 | 2/1998 |

* cited by examiner

STEERING APPARATUS FOR A CAR AND METHOD OF MANUFACTURING THE SAME

CROSS-REFERENCE TO RELATED APPLICATION

This application is a continuation of application Ser. No. 10/207,781 filed Jul. 31, 2002 now abandoned.

This application claims the benefit of Japanese Patent Applications No. 2001-238198 and No. 2001-383244 which are hereby incorporated by reference.

BACKGROUND OF THE INVENTION

1. Field of the Invention

The present invention relates to a steering apparatus for a car with the enhanced retaining force of a telescopically adjustable steering column to a car body, and a method of manufacturing the same steering apparatus.

2. Related Background Art

Conventionally, it is required for a steering apparatus for a car to enhance the pressing force or the retaining force of a telescopically adjustable or tilt adjustable steering column to a car body.

For instance, Japanese Patent Application Laid-Open No. 10-35511 discloses a tilt/telescopic steering apparatus in which a steering column is arranged to be capable of being tilt adjustable and telescopically slidable and a fixed member to steering column is brought into pressure contact with a fixing member to car body to be fastened and retained by the use of a clamp mechanism at the time of tilt/telescopic clamp. Especially, at the time of clamp by the use of the clamp mechanism, a large number of thin friction plates made of metal are interposed between a fixing member to car body and the clamp mechanism so as to drastically enhance the retaining force (the pressing force) of the steering column to the car body.

Generally, the fixed member to steering column (e.g., a distance bracket) is formed with an elongated hole for telescopic adjustment through which a fastening bolt of a clamp member is inserted so as to guide the steering column in the axial direction. This fixed member to steering column is formed separately from the steering column and is secured to the steering column by welding or caulking when it is manufactured.

However, in the conventional steering apparatus for a car described above, since the fixed member to steering column (distance bracket) is separately formed from the steering column and welding or caulking is employed for its manufacture, the steering column itself can not be maintained to be of high rigidity. There is another problem that the manufacturing cost required for the materials, the processing works, assembly, etc., is increased and the total weight of the steering column is also increased.

Note that in the above-mentioned Japanese Patent Application Laid-Open No. 10-35511, in Japanese Utility Model Application Laid-Open No. 6-74562, and in EP0770537A1, a pair of flanges which are cut up from the steering column to be bent are provided with a pair of elongated holes for telescopic adjustment, and these elongated holes are formed on the steering column.

However, since the flanges are cut-up flanges, the steering column is formed to have an "open section". Thus, the steering column itself can not be formed as having high rigidity, so that the high retaining force of the steering column to the car body can not be always maintained.

In Japanese Patent Application Laid-Open No. 8-276852 and in EP0721875A1, a swelled portion is formed as a unitary structure with a steering column by press work and this swelled portion is formed with a circular hole for tilt adjustment. Since the steering column has a "closed section" with this arrangement, the steering column itself can be maintained to have high rigidity. Moreover, this circular hole for tilt adjustment is a simple circular hole and is not extended in the axial direction, so that the swelled portion is small in size and can be easily formed by press work. However, when an elongated hole for telescopic adjustment which is largely extended in the axial direction is to be formed in the swelled portion, the swelled portion has to be formed to be elongated in the axial direction as a unitary structure with the steering column, so that it will be extremely difficult to realize such a structure if using the press work like that disclosed in the above disclosures.

SUMMARY OF THE INVENTION

In order to solve the problems of the prior art described above, the present invention aims of providing a steering apparatus for a car in a simple structure in which the retaining force of the steering column to the car body can be reinforced by providing the steering column capable of telescopic adjustment with high rigidity, and the manufacturing cost or the weight of which can be largely reduced, as well as a method of manufacturing such a steering apparatus.

In order to achieve the above object, according to the present invention, there is provided a steering apparatus for a car capable of telescopic adjustment of a steering column, wherein the steering column is integrally provided with a swelled portion formed from a tubular material by a hydroforming process and an elongated hole for telescopic adjustment is formed on a side surface of this swelled portion through which a fastening bolt of a clamp mechanism is inserted.

The steering apparatus may be formed with a large number of linear ribs, on at least one of the side surfaces of the swelled portion of the steering column, which are integrally molded in the axial direction thereof for tilt adjustment or in a direction perpendicular to the axial direction for telescopic adjustment, so as to be meshed with a gear provided on a fixing bracket to car body.

Also, according to the present invention, there is provided a method of manufacturing a steering apparatus for a car capable of telescopic adjustment of a steering column, which comprises a step of molding a tubular material into a steering column which is integrally provided with a swelled portion by the hydroforming process, and a step of forming an elongated hole for telescopic adjustment through which a fastening bolt of a clamp mechanism is inserted.

As described above, according to the present invention, the tubular material is molded into the steering column integrally having the swelled portion by the hydroforming process, whereby the swelled portion to be formed with the elongated hole for telescopic adjustment is formed to have a closed section which is a unitary structure with the steering column. Consequently, it is possible to provide the steering apparatus with the high rigidity so as to give the steering column the remarkably high retaining force to the car body, and at the same time, to largely reduce the manufacturing cost required for the materials, processing works and the assembling and the weight of the steering apparatus.

Note that the hydroforming process is a process of accommodating a thin tubular member into a mold, filling the tubular member with pressure water or oil, and then expanding the tubular member into a desired form. Since having no welded portion, this process is advantageous in obtaining higher strength and rigidity and reducing the manufacturing cost and the weight of the manufactured apparatus over a conventional method of forming a member having a unitary structure with a closed section by performing welding after press work.

DETAILED DESCRIPTION OF THE PREFERRED EMBODIMENTS

Description will be made below on embodiments of a steering apparatus for a car according to the present invention and a method of manufacturing the same apparatus with reference to the drawings.

Figure 1A:
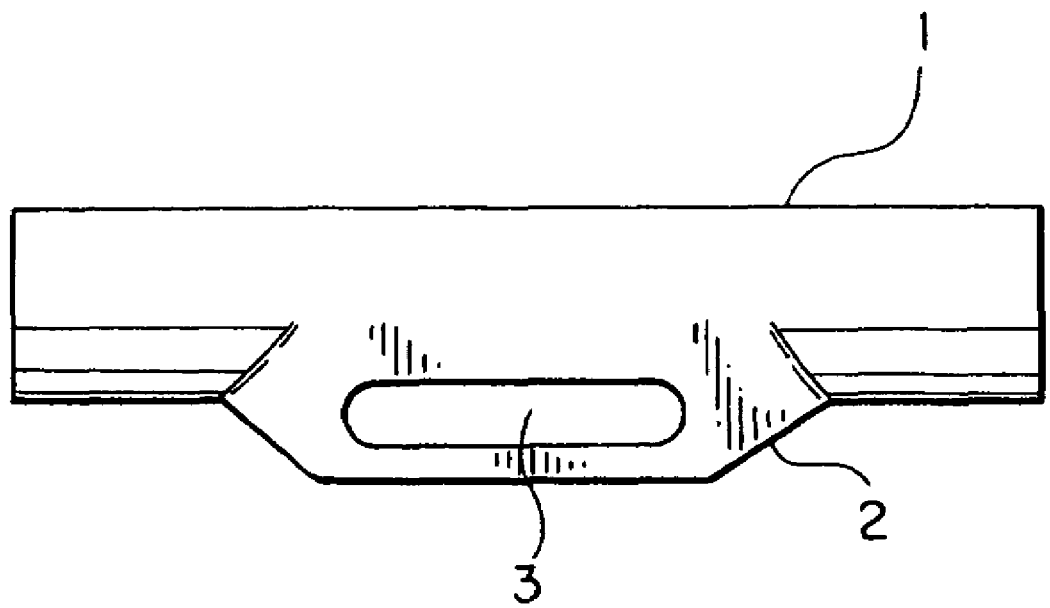
FIGS. 1A and 1B respectively represent schematic side view and front view of a steering column of a steering apparatus for a car according to a first embodiment of the present invention.
Figure 1B:
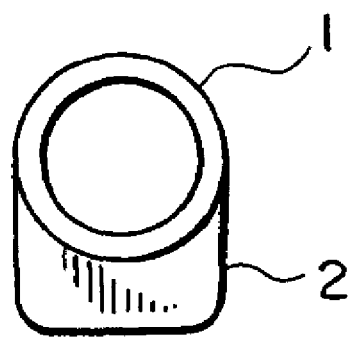
Figure 2A:
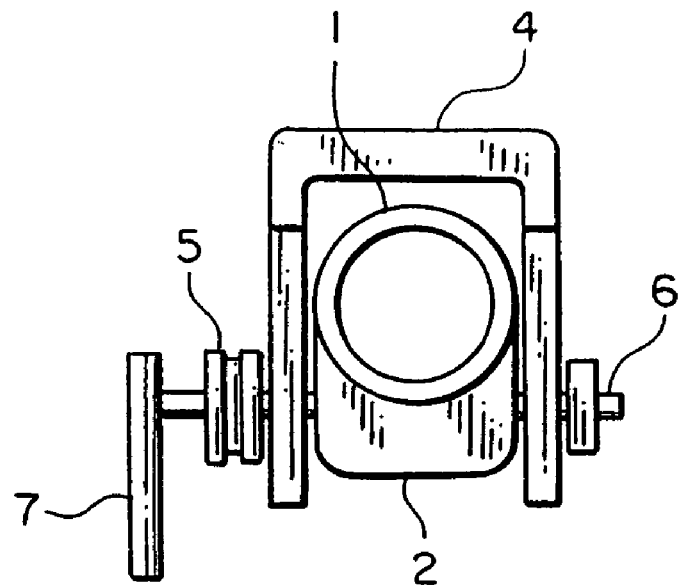
FIGS. 2A and 2B respectively represent schematic front view and side view of the steering apparatus for a car according to the first embodiment of the present invention.
Figure 2B:
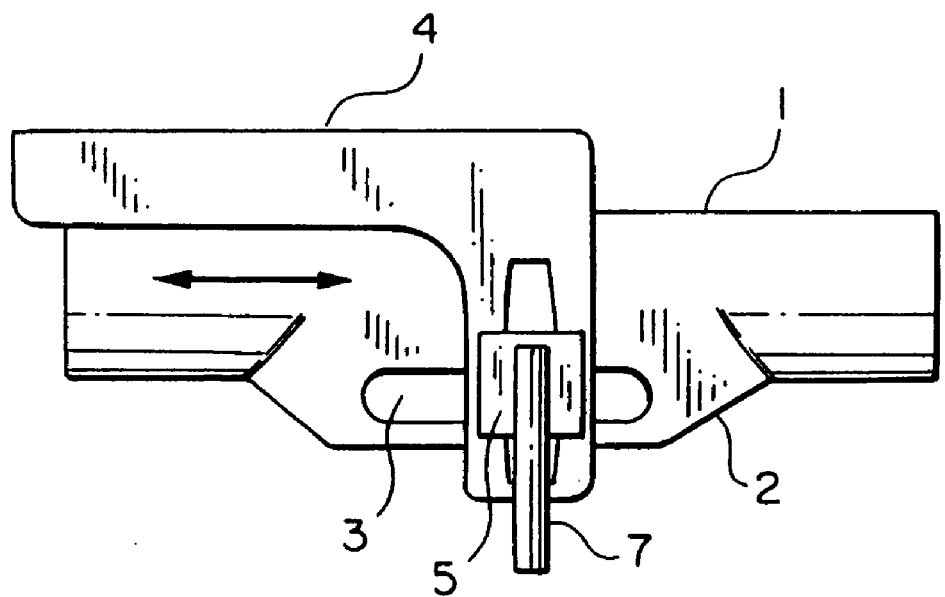
Figure 3A:
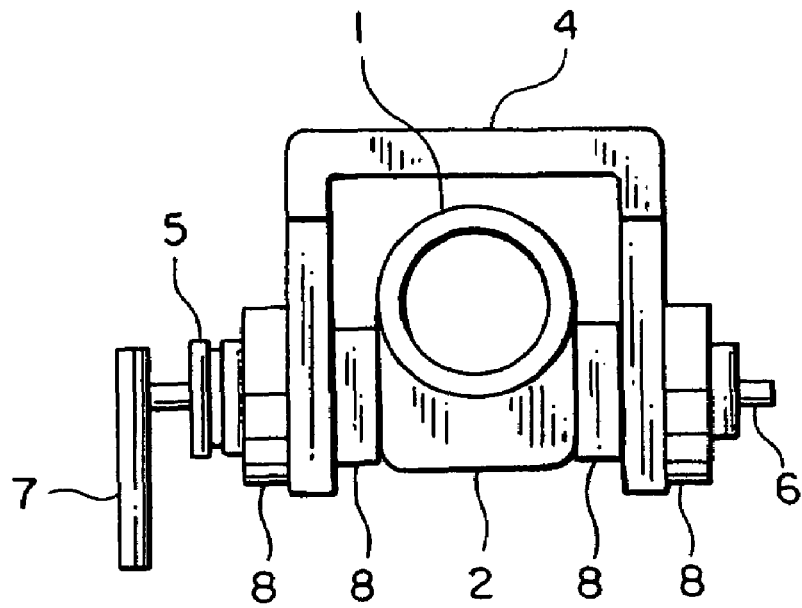
FIGS. 3A and 3B respectively represent schematic front view and side view of a steering column of a steering apparatus for a car according to a second embodiment of the present invention.
Figure 3B:
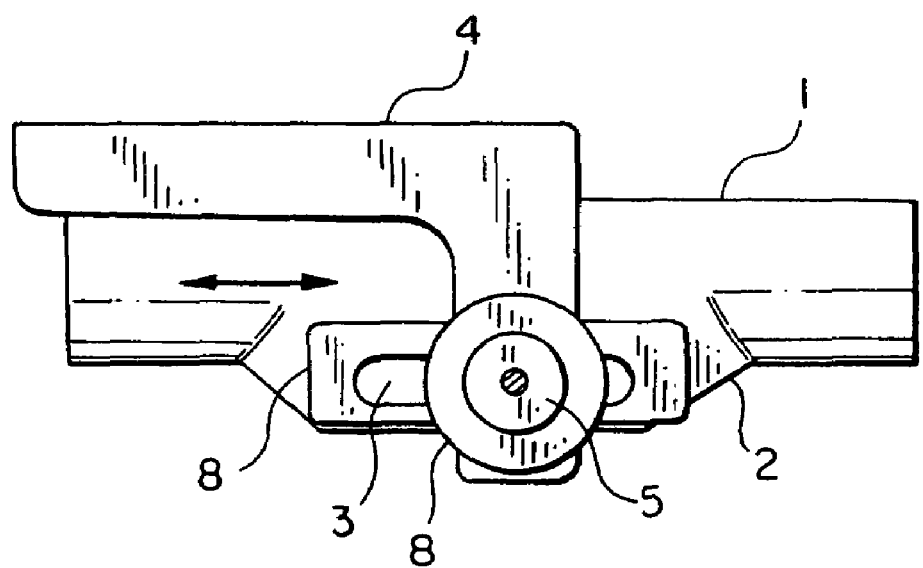
Figure 4:
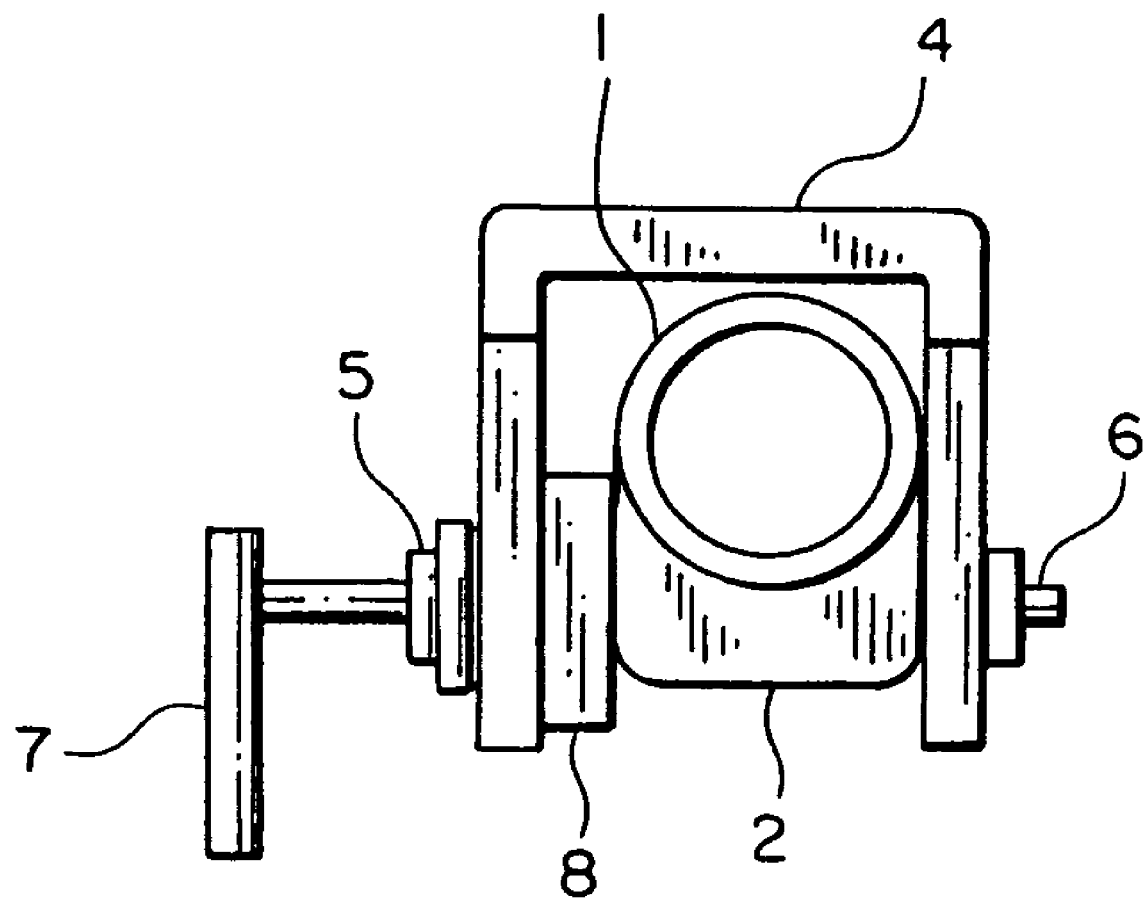
FIG. 4 represents a schematic front view of a steering column of a steering apparatus for a car according to a third embodiment of the present invention.
Figure 5A:
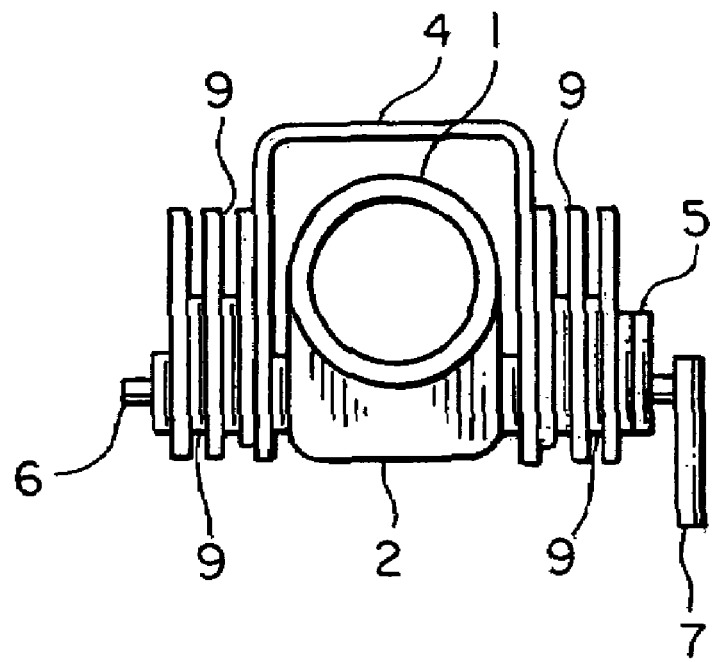
FIGS. 5A and 5B respectively represent schematic front view and side view of a steering column of a steering apparatus for a car according to a fourth embodiment of the present invention.
Figure 5B:
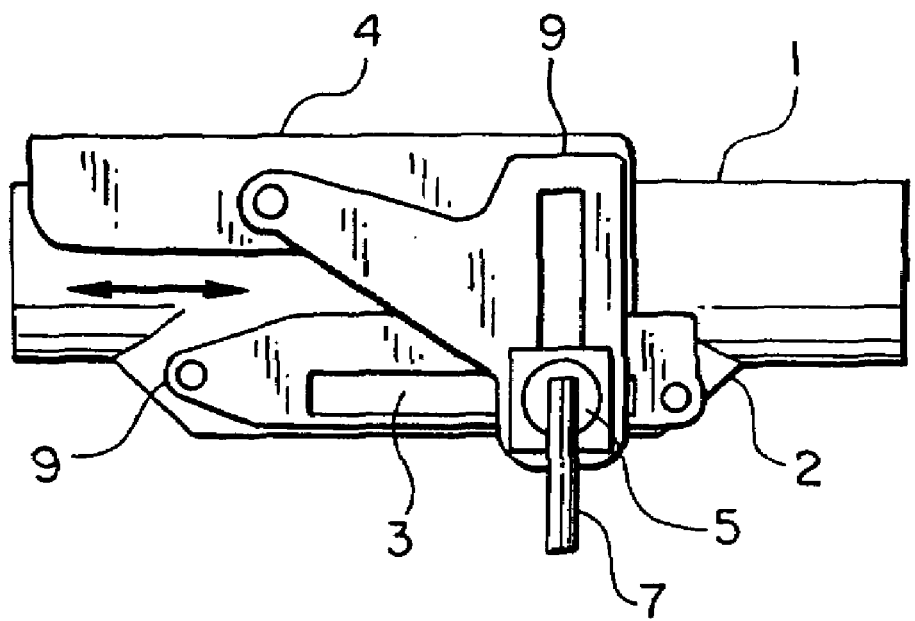
Figure 6A:
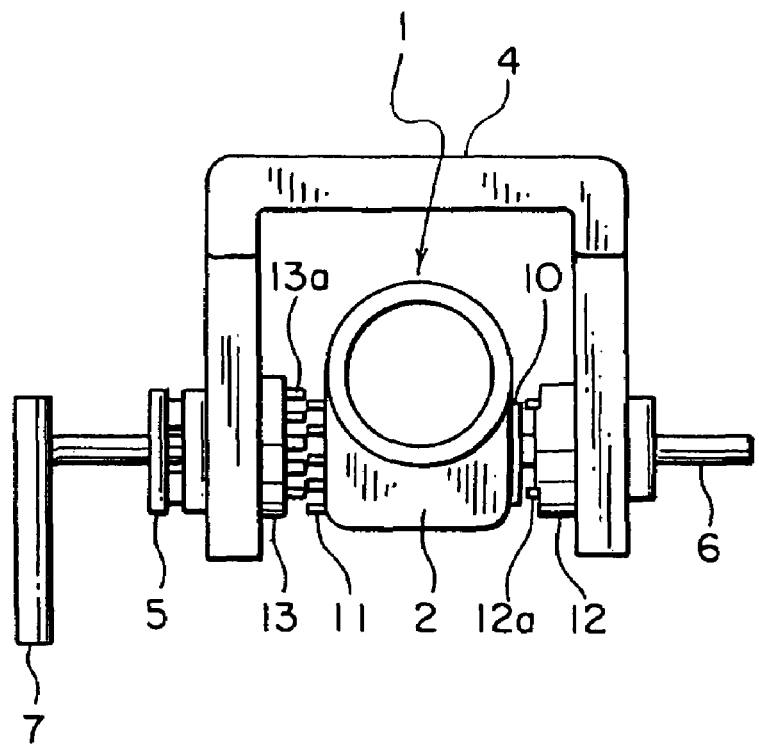
FIGS. 6A and 6B respectively represent schematic front view and side view of a steering apparatus for a car according to a fifth embodiment of the present invention.
Figure 6B:
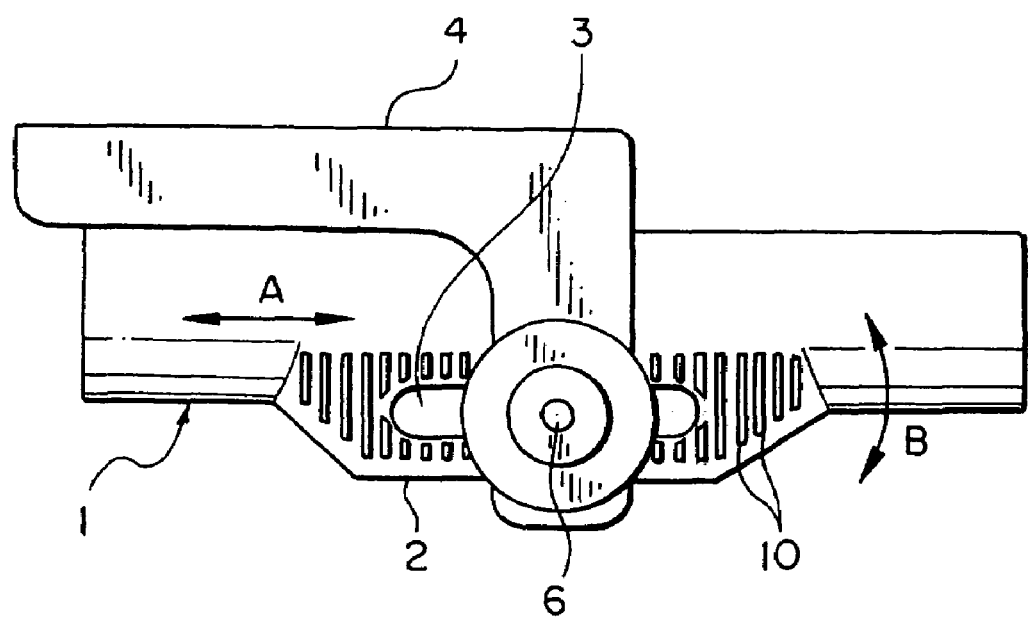
Figure 7A:
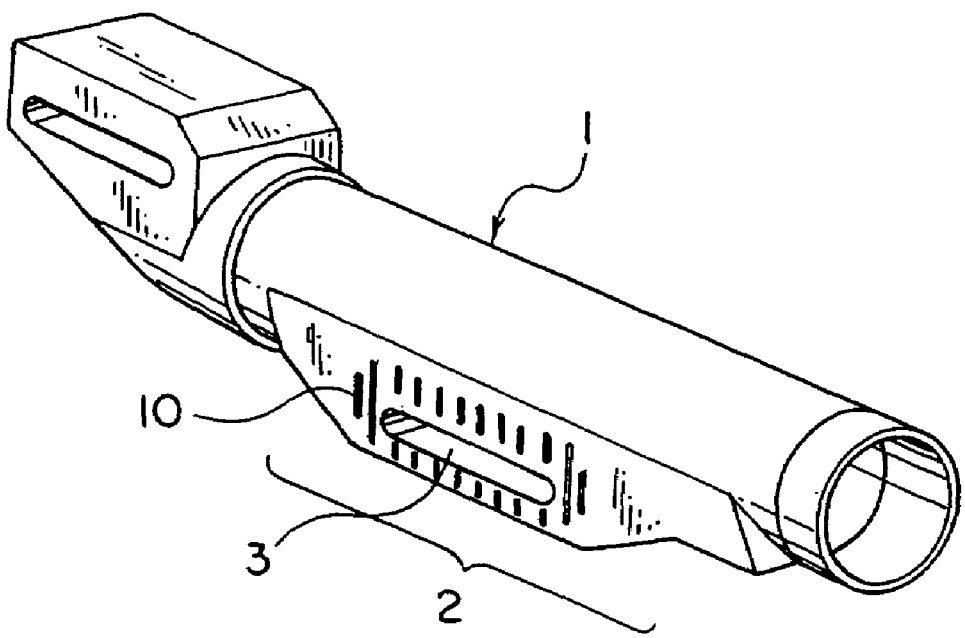
FIGS. 7A and 7B represent perspective views for showing a steering column which is provided with telescopic retaining ribs and tilt retaining ribs according to the fifth embodiment of the present invention.
Figure 7B:
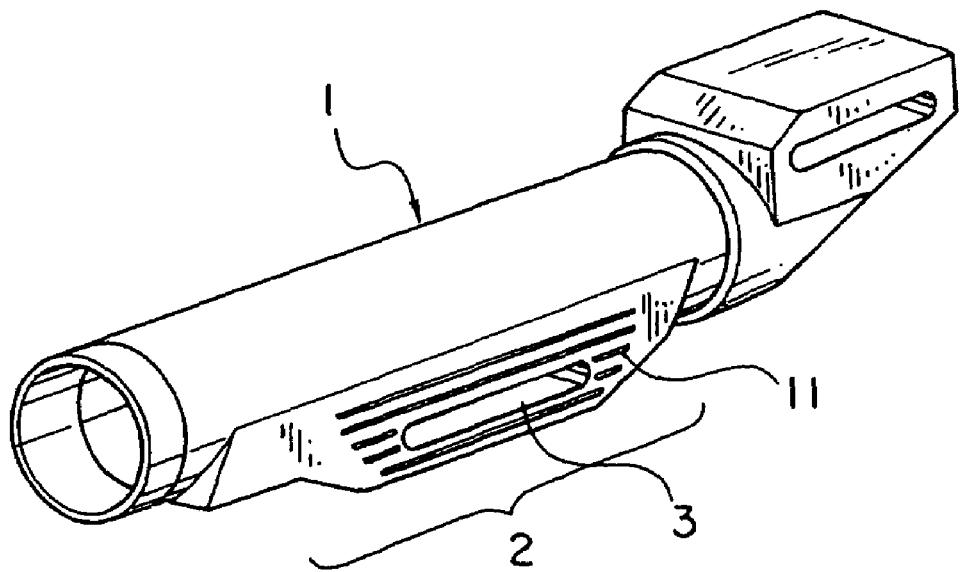
Figure 8A:
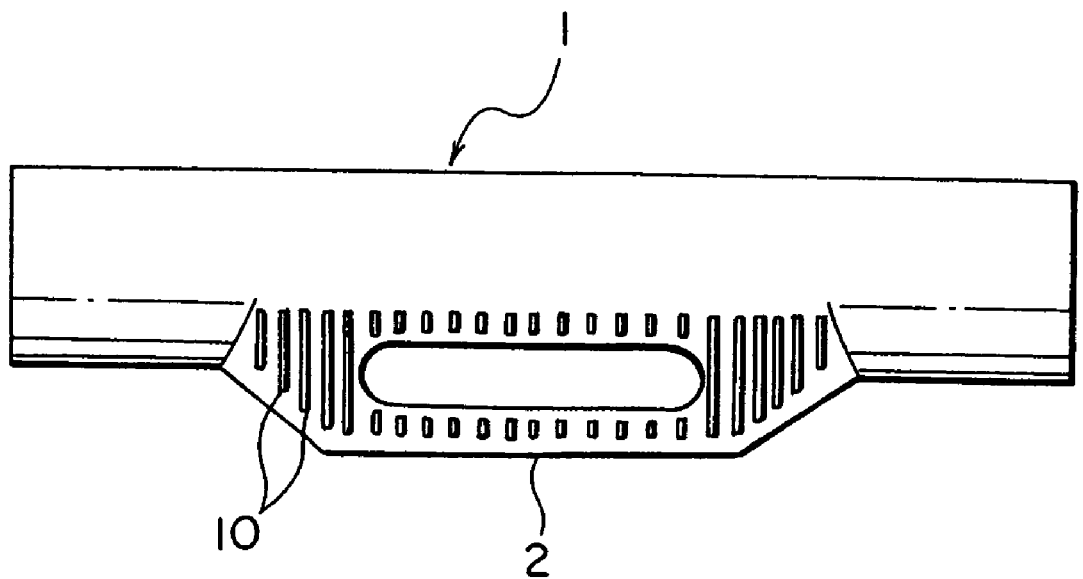
FIGS. 8A and 8B represent side views of the steering column for showing the telescopic retaining ribs and the tilt retaining ribs according to the fifth embodiment of the present invention.
Figure 8B:
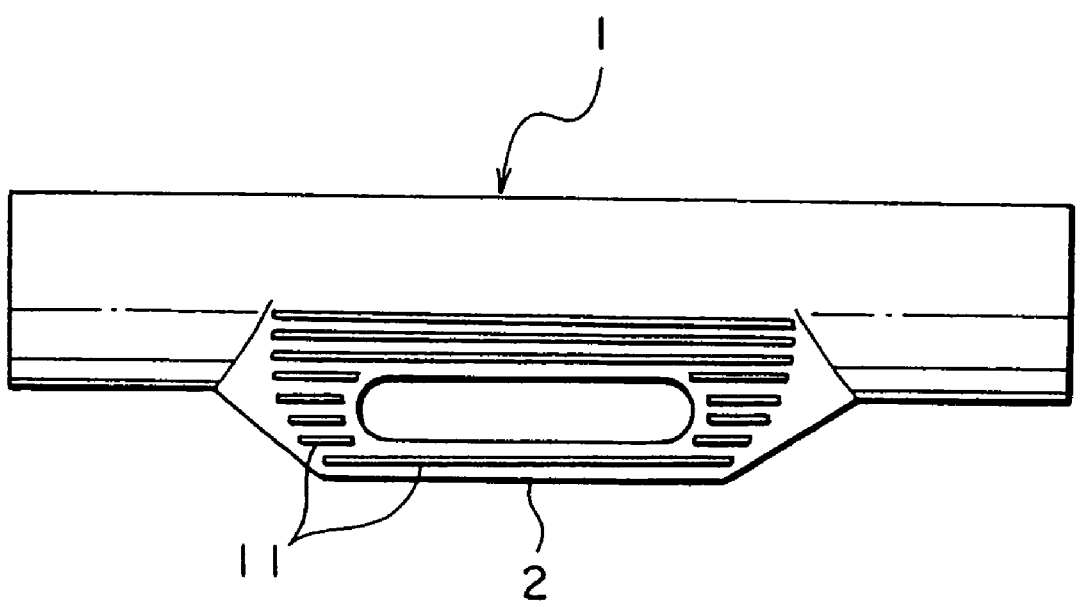
Figure 9A:
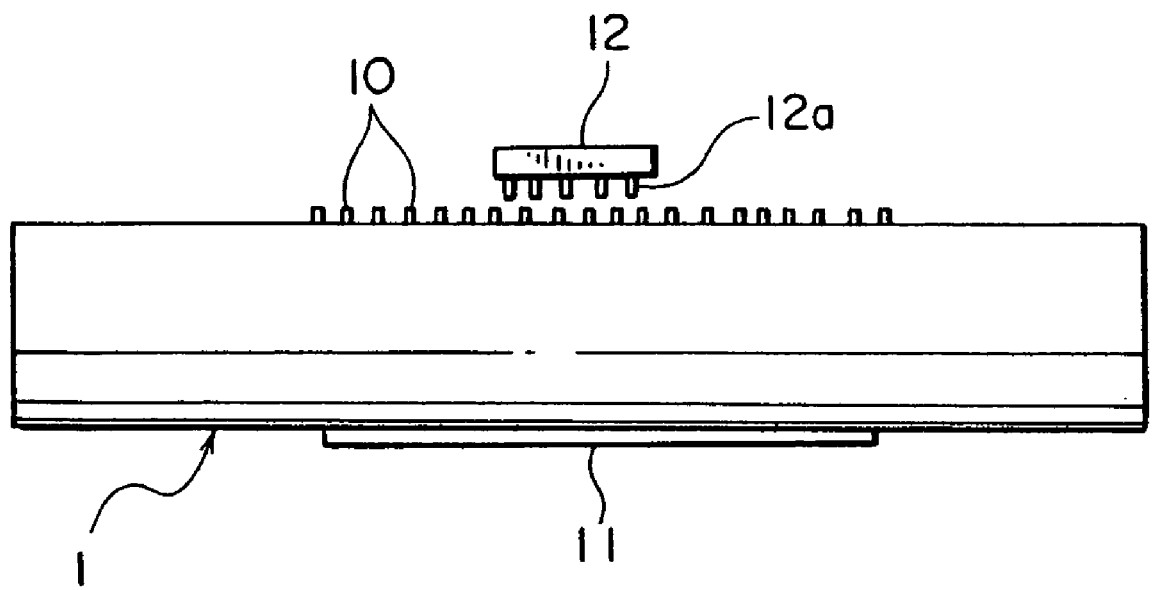
FIGS. 9A and 9B represent explanatory views for showing a positional relationship among the telescopic retaining ribs, the tilt retaining ribs and a gear according to the fifth embodiment of the present invention.
Figure 9B:
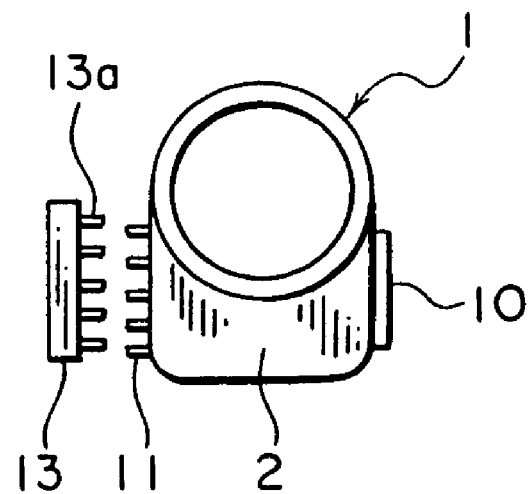

FIGS. 1A and 1B respectively represent schematic side view and front view of a steering column of a steering apparatus for a car according to the first embodiment of the present invention; FIGS. 2A and 2B respectively represent schematic front view and side view of the steering apparatus for a car according to the first embodiment; FIGS. 3A and 3B respectively represent schematic front view and side view of a steering column of a steering apparatus for a car according to the second embodiment of the present invention; FIG. 4 represents a schematic front view of a steering column of a steering apparatus for a car according to the third embodiment of the present invention; FIGS. 5A and 5B respectively represent schematic front view and side view of a steering column of a steering apparatus for a car according to the fourth embodiment of the present invention; FIGS. 6A and 6B respectively represent schematic front view and side view of a steering apparatus for a car according to the fifth embodiment of the present invention; FIGS. 7A and 7B represent perspective views for showing a steering column which is provided with telescopic retaining ribs and tilt retaining ribs according to the fifth embodiment of the present invention; FIGS. 8A and 8B represent side views of the steering column for showing the telescopic retaining ribs and the tilt retaining ribs according to the fifth embodiment of the present invention; and FIGS. 9A and 9B represent explanatory views for showing a positional relationship among the telescopic retaining ribs, the tilt retaining ribs and a gear according to the fifth embodiment of the present invention.

First, the first embodiment will be described with reference to FIGS. 1A and 1B and FIGS. 2A and 2B.

As shown in FIGS. 1A and 1B, in the first embodiment, a tubular material is molded by the hydroforming process into a steering column 1 which is integrally provided with a swelled or expanded portion 2 serving as a column shaft bearing portion. A pair of elongated holes 3 for telescopic adjustment are formed on the both side surfaces of this swelled portion 2 for inserting a fastening bolt 6 of a clamp mechanism 5 therethrough.

In this respect, the hydroforming process is a process of accommodating a thin tubular member into a mold, filling the tubular member with pressure water or oil, and then expanding the tubular member into a desired form. Since having no welded portion, this process is advantageous in obtaining higher strength and rigidity and reducing the manufacturing cost and the weight of the manufactured apparatus over the conventional method of forming a member having a unitary structure with a closed section by performing welding after press work.

This tubular member is generally a steel tube. However, a nonferrous metal such as aluminum may be used in order to reduce the weight of the member.

As described above, in the first embodiment, the swelled portion 2 serving as the column shaft bearing portion is a unitary structure with the steering column 1 having a closed section with no joint therebetween, so that it is possible to obtain high rigidity of the steering column 1 itself to drastically improve the retaining force of the steering column to the car body, and it is also possible to largely reduce the manufacturing cost required for the materials, processing works and assembling or the weight of the steering apparatus.

As shown in FIGS. 2A and 2B, in the first embodiment, the column shaft bearing portion (swelled portion) 2 for telescopical adjustment is provided within a fixing bracket to car body 4 which has a section in a reverse U shape. The fastening bolt 6 of the clamp mechanism 5 of a cam mechanism is inserted through the elongated holes 3 for telescopic adjustment of the column shaft bearing portion 2. It is arranged such that the column shaft bearing portion 2 can be brought into pressure contact with, or can be retained by the fixing bracket to car body 4, or this retention can be released, by rotating a clamp lever 7 of the clamp mechanism 4.

The second embodiment will be described below with reference to FIGS. 3A and 3B.

The second embodiment is arranged such that the column shaft bearing portion (swelled portion) 2 is sandwiched by and between two high friction members 8 through which the fastening bolt 6 is inserted and which are retained on both of the inner side surfaces of the fixing bracket to car body 4 having the reverse U-shaped section. Thus, the swelled portion 2 is indirectly retained by the fixing bracket to car body 4. The high friction members 8 are attached to the both outer side surfaces of the fixing bracket to car body 4, so that each retaining portion of the fixing bracket to car body 4 is sandwiched by and between the two high-friction members 8, 8. Other structures and operations of the second embodiment are the same as those of the foregoing first embodiment, and the similar constituent parts have the same referential numbers.

The high friction member 8 is of an asbestos-free type which includes no asbestos. The high-friction members of this type are basically divided into three categories. If the coefficient of static friction of the high friction member is not less than 0.45, any material of any of the three kinds may be used for the high friction member. However, a material having a high permanent set can not be used since it weakens the retaining force or power.

Materials for this high friction member 8 may include a semi-metallic steel metal which comprises steel fiber in 30% to 50% as a basic material and employs copper fiber, or a roll steel which comprises steel fiber in 10% to 30% as a basic material and employs copper fiber, or a non steel which employs nonmetal such as aramid fiber, ceramic fiber, glass fiber, or the like, as a basic material. A Ferodo, or the like, may be used for extinction of sound. However, titanium potassium which is harmful to the human body is not used.

Note that in order to bond the high friction member with a backing plate, normally a hot bonding method is used. After oil is removed from an iron plate, an adhesive is applied onto the backing plate and the high friction members are placed thereon, which are then heated at one hundred and several tens degrees centigrate. Thereafter, the surface of the product is polished after going through hardening process. The thickness of the high friction member 8 is about 2 mm, inclusive of the backing plate, and the thickness of the high-friction member 8 only is about 1 mm.

As described above, according to the second embodiment, when clamping is effected by the clamp mechanism 5, the column shaft bearing portion 2 is fastened to the fixing bracket to car body 4 by the use of the high friction members 8, so the pressing force and the retaining force of the steering column 1 to the car body can be conspicuously enhanced. At the same time, since a large number of metallic friction plates are not used, the cost of materials, processing works, and assembling can be largely reduced. In addition, a space for a column retaining mechanism can be reduced.

Next, the third embodiment of the present invention will be described with reference to FIG. 4.

In the third embodiment, one high friction member 8 is provided on one side of the column shaft bearing portion 2, so that the fixing bracket to car body 4 pinches the column shaft bearing portion (swelled portion) 2 through the high friction member 8 to indirectly retain the column shaft bearing portion 2. Other structures and operations of the third embodiment are the same as those of the foregoing second embodiment, and the similar constituent parts have the same referential numbers, except that the clamp mechanism 5 is of a screw mechanism type or a toggle type.

The fourth embodiment of the present invention will be described with reference to FIGS. 5A and 5B.

In the fourth embodiment, the column shaft bearing portion (swelled portion) 2 is sandwiched to be indirectly retained by and between a large number of friction plates 9 made of metal. More in detail, at each outside of the fixing bracket to car body 4 which pinches the column shaft bearing portion (swelling portion) 2, there are disposed three friction plates 9 each formed with a hole for tilt adjustment and two friction plates 9 each formed with a hole for telescopic adjustment and arranged between the neighboring two friction plates formed with the tilt adjustment holes. Those friction plates 9 are fastened by the clamping mechanism 5. Other structures and operations of the fourth embodiment are the same as those of the foregoing first embodiment, and the similar constituent parts have the same referential numbers.

When a clamping operation is effected by the clamp mechanism 5, a large number of thin friction plates 9 made of metal are interposed between the clamp mechanism 5 and the column shaft bearing portion 2, as shown in FIGS. 5A and 5B, whereby the pressing force and the retaining force of the steering column 1 to the car body can be conspicuously enhanced.

The fifth embodiment of the present invention will be described below with reference to FIGS. 6A and 6B through FIGS. 9A and 9B.

The fifth embodiment is arranged such that a tubular material is molded into a steering column 1 which comprises a swelled portion 2 as a unitary structure therewith by the hydroforming process, as shown in FIGS. 7A and 7B, and at the same time, as shown in FIGS. 6A and 6B, telescopic retaining ribs 10 and tilt retaining ribs 11 which are formed on the side surfaces of the swelled portion 2, respectively as unitary structures, are meshed with gears 12 and 13 provided on the side of the fixing bracket to car body 4, whereby the column shaft bearing portion 2 is brought into pressure contact with and retained by the fixing bracket to car body 4. Other structures and operations of the fifth embodiment are the same as those of the foregoing first embodiment, and the similar constituent parts have the same referential numbers.

Out of FIGS. 7A through 9B, FIGS. 7A, 8A and 9A illustrate a layout of the telescopic retaining ribs 10. The telescopic retaining ribs 10 are a large number of linear ribs which are formed on one side of the swelled portion 2 in a direction perpendicular to the axial direction, representing a gear teeth-like section in the axial direction. A gear (a gear for telescopic adjustment) 12 which is to be meshed with these ribs 10 has a shape with protruded teeth on the surface facing the ribs 10. As shown in FIG. 6A, when the clamp lever 7 is rotated, the teeth 12a of the gear 12 are fitted into the grooves of the ribs 10 to be latched, so that the steering column 1 can be securely positioned especially in the axial direction thereof (the direction indicated by the arrow A).

On the other hand, FIGS. 7B, 8B and 9B show a layout of the tilt retaining ribs 11. The tilt retaining ribs 11 are formed on the other side surface of the swelled portion 2, presenting a gear teeth-like section in the axial direction thereof. A gear (a gear for tilt adjustment) 13 which is to be meshed with these ribs 11 has a shape with protruded teeth on the surface facing the ribs 11, in the same manner as the gear 12 for telescopic adjustment. The teeth 13a are fitted into the grooves of the ribs 11 to be latched, so that, as shown in FIGS. 6A and 6B, the positioning of the steering column 1 can be securely effected especially in the direction of rotation around the fastening bolt 6 of the steering column 1 (the direction indicated by the arrow B).

As described above, the telescopic retaining ribs 10 and the tilt retaining ribs 11 are respectively formed on the side surfaces of the swelled portion 2, so that the pressing force and the retaining force of the steering column 1 in the axial direction and the direction of rotation thereof can be enhanced, and at the same time, the rigidity of the swelled portion 2 can be increased due to the structure of the ribs.

Note that the present invention is not limited to the five embodiments described above, but can be varied in other various manners.

As described above, according to the present invention, since the tubular material is molded into the steering column which integrally comprises the swelled portion by the hydroforming process and thereby the swelled portion having the elongated hole for telescopic adjustment formed thereon is formed to have a closed section as a unitary structure with the steering column, it is possible to obtain the high rigidity for the steering column itself so as to drastically enhance the retaining force of the steering column to the car body and to largely reduce the manufacturing cost required for the materials, processing works, and assembling or the weight of the steering apparatus.

What is claimed is:

1. A telescopically adjustable steering column comprising:
   a steering column, elongated in an axial direction, to rotatably support a steering shaft therethrough, said steering column including a unitary tubular member, closed in lateral cross section, having a swollen portion hydroformed at an intermediate position thereof and elongated in the axial direction, said swollen portion including:
      a pair of flat surface portions,
      a flat bottom portion to integrally connect said pair of flat surface portions, and
      a pair of slots, elongated in the axial direction, respectively formed in alignment in said pair of flat surface portions;
   a support mechanism to releaseably secure said steering column to a vehicle body, said support mechanism including a bracket member having an extended portion, fixed to the vehicle body, and a pair of flat plate portions extending in an orientation normal to said extended portion and opposed to each other to locate therebetween a portion of said steering column; and
   a clamp mechanism to clamp said steering column from both sides thereof, said clamp mechanism including a bolt inserted through said pair of slots of said steering column and a fastening mechanism to fasten said bolt to said flat plate portions of said bracket member and fix said bolt relative thereto;
   wherein, upon said bolt being unfastened, said steering column is movable in the axial direction to allow telescopic adjustment of said steering column relative to said bracket member;
   said bracket member includes at least one gear; and
   at least one of said pair of flat surface portions includes a plurality of integrally molded ribs to engage said gear, said plurality of ribs oriented in the axial direction.

2. A telescopically adjustable steering column assembly according to claim 1, wherein said pair of slots are offset from a centerline of said tubular member in a direction perpendicular to the centerline.

3. A telescopically adjustable steering column assembly comprising:
   a steering column, elongated in an axial direction, to rotatably support a steering shaft therethrough, said steering column including a unitary tubular member, closed in lateral cross section, having a swollen portion hydroformed at an intermediate position thereof and elongated in the axial direction, said swollen portion including:
      a pair of flat surface portions,
      a flat bottom portion to integrally connect said pair of flat surface portions, and
      a pair of slots, elongated in the axial direction, respectively formed in alignment in said pair of flat surface portions;
   a support mechanism to releaseably secure said steering column to a vehicle body, said support mechanism including a bracket member having an extended portion, fixed to the vehicle body, and a pair of flat plate portions extending in an orientation normal to said extended portion and opposed to each other to locate therebetween a portion of said steering column; and
   a clamp mechanism to clamp said steering column from both sides thereof, said clamp mechanism including a bolt inserted through said pair of slots of said steering column and a fastening mechanism to fasten said bolt to said flat plate portions of said bracket member and fix said bolt relative thereto;
   wherein, upon said bolt being unfastened, said steering column is movable in the axial direction to allow telescopic adjustment of said steering column relative to said bracket member;
   said bracket member includes a first gear and a second gear; and
   said pair of flat surface portions includes:
      a first flat surface portion having a first plurality of integrally molded ribs to engage said first gear, said first plurality of ribs being oriented in the axial direction; and
      a second flat surface portion having a second plurality of integrally molded ribs to engage said second gear, said second plurality of ribs being oriented in a direction perpendicular to the axial direction.

4. A telescopically adjustable steering column assembly according to claim 3, wherein said pair of slots are offset from a centerline of said tubular member in a direction perpendicular to the centerline.

* * * * *